Dec. 16, 1958             G. E. KAYE             2,864,880
BATTERY CONSTRUCTION AND CELL THEREFOR
Filed Sept. 27, 1954
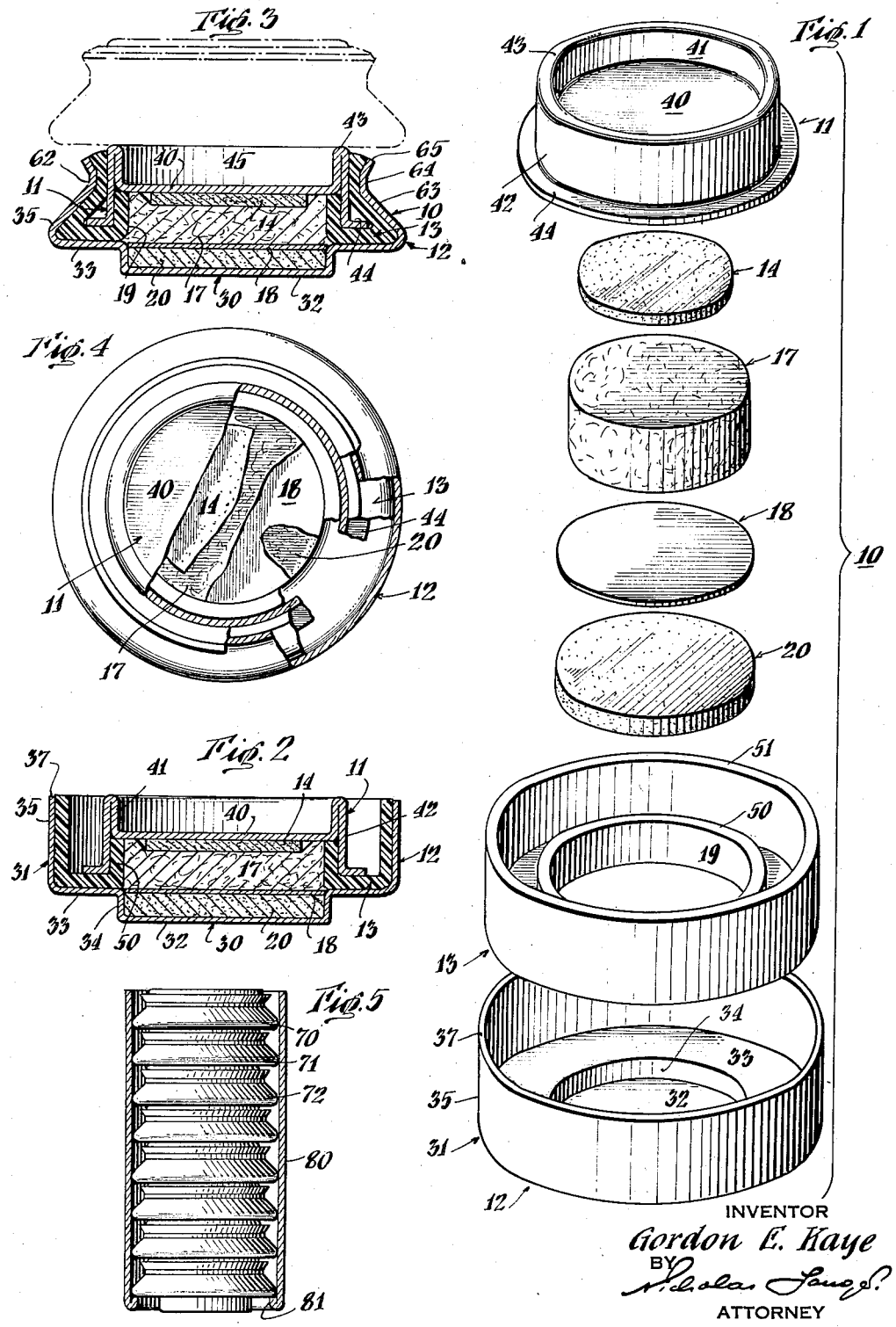
INVENTOR
Gordon E. Kaye
BY
ATTORNEY

20

United States Patent Office 2,864,880
Patented Dec. 16, 1958

2,864,880

BATTERY CONSTRUCTION AND CELL THEREFOR

Gordon E. Kaye, Mount Kisco, N. Y., assignor to P. R. Mallory & Co., Inc., Indianapolis, Ind., a corporation of Delaware Application September 27, 1954, Serial No. 458,500

5 Claims. (Cl. 136—111)

The present invention relates to the construction of electric batteries formed of a multiplicity of primary cells and is particularly directed to such devices including means and methods for constructing and assembling multi-voltage batteries from a composite of several individual low voltage units.

By the present invention there is provided a new and novel battery comprising a plurality of individual cell units each containing a separate anode and a separate cathode formed as individual containers thereof. An insulator is placed between said containers to electrically insulate the containers from each other. The containers have a configuration such that one will fit within the other to become the top and bottom of each of the individual cells with the top and bottom thereof having diameters such that the bottom of one cell is adapted to snugly fit within the top of a similarly formed adjacent cell. Thus, a tight electrical connection is made therebetween solely by such interfitting of the anode of one cell to the cathode of the adjacent cell. The cells are thus adapted to provide a battery of a predetermined high voltage in accordance with the number of series interconnected cells.

It is therefore a prime object of the present invention to provide a mechanically positive intercell contact for groups of cells connected so as to result in mechanically and electrically continuous multi-volt stacks without resorting to the use of any additional parts or methods such as soldering, welding, brazing, etc.

It is an object of this invention to provide a cell container structure which materially simplifies many manufacturing problems and makes possible quick assembling of dry cells into high voltage batteries.

It is an object of the present invention to provide a novel and improved type battery construction utilizing a multiplicity of individual primary cells.

It is another object of the present invention to provide a novel battery comprising a plurality of individual, metal, self-interlocking primary cell units electrically connected only by means of their containers.

Still another object of the present invention is to construct an electric battery comprising a plurality of low voltage cells in a manner such that any desired high voltage may be obtained by interconnecting individual unitary cells; the connections between the individual cells being made simply by interlocking and snap fitting of one cell to another.

Still another object of the present invention is to fabricate a high voltage battery comprising a plurality of nested individual cells, each of said cells having a desired voltage but which may in conjunction with other cells provide a greater voltage.

Other advantages become apparent in the present invention in which the construction makes possible the elimination of excessive handling of cell and battery components during manufacturing and facilitates applications for automatic methods in assembling the components thereof.

The invention, in another of its aspects, relates to novel features of the instrumentalities described herein for the principles of the present invention and to the novel principles employed in the instrumentalities whether or not these features and principles may be used in the said object and/or in the said field.

Other objects of the invention and the nature thereof will become apparent from the following description considered in connection with the accompanying figures of the drawing and wherein the scope of the invention is determined rather from the dependent claims.

In the figures:

Figure 1 is an elevational view of one cell in which the construction of the individual components are adapted to interfit so as to afford a special configuration to the anode and cathode portions thereof enabling the units to be stacked in a snap action fashion;

Figure 2 is a cross-sectional view of the cell unit shown in Figure 1, as assembled and prior to the crimping operation to give the configuration shown in Figure 3;

Figure 3 is a view of the cell shown in Figure 1 with parts thereof shown in cross-section and as adapted to show the assembled configuration for the cell, such that it is adapted to mate with another similar cell shown and to be snap fitted within the confines thereof so as to give a desired voltage output in accordance with the series effect of a predetermined number of such force fitted snap cells;

Figure 4 is a top view of the embodiment of the invention as shown in Figure 2 with portions thereof broken away to show the assembled construction thereof; and Figure 5 is an illustration of a battery assembly as including a cardboard sleeve which may be adapted to circumscribe, if desired, the battery; said sleeve being specially constructed to substantially fixedly hold a determined number of individual cells therewithin and to have various directive indicia or ratings printed thereupon.

Generally speaking, the present invention makes possible the construction of a high voltage battery from individual cells by the use of certain metal contours in the opposite ends of each of the individual cell casings so as to allow for a snap-fit of adjacent cells. This is done by pressing together the extruded casing of one cell into the contour cavity of the cell adjacent thereto, thereby eventually culminating in a mechanical assembly which provides for mechanical and electrical continuity for a desired number of cells.

The invention provides many advantages in construction since it eliminates all formerly used but now extraneous connecting parts and further eliminates the necessity for methods of assembly, such as soldering, welding, and/or brazing. A further advantage of this novel construction is the improvement of electrical contact pressure by providing a tight and positive force fit connection at the point of electrical contact. This, of course, increases the efficiency of operation of the individual cells and effectuates a higher overall efficiency for the multi-unit high voltage assembly.

In carrying out the features of the invention, the opposite ends of the metal casings of the individual cells are formed mechanically so as to provide an extrusion at the positive end and a cavity at the negative end, or vice versa, so as to allow for a force fit or snap action contact between cells by applying sufficient pressure to force the extrusion of one cell into the cavity of the adjacent cell. By repeating this procedure any number of cells can be added or subtracted thereby, adding or subtracting voltages without resorting to the use of any additional parts to attach cells to one another, or by resorting to such methods as soldering, welding and/or brazing for the same purpose.

Referring now to the drawings, in Figures 1 and 2, there is shown one cell of a group of cells whose extruded portions and cavity portions of each are used in constructing a battery assembly. This is accomplished by snap action and lock fitting thereon as shown in Figure 3. The individual cell units of the stackup may be of the zinc, potassium hydroxide, mercuric oxide system which is now commercially available and which is shown herein.

Such a cell 10 would include an extruded anode container 11, fabricated, for example, of tin plated steel, a cathode container 12 fabricated of nickel plated steel, and a plastic electrical insulative sleeve 13, which may be made as a grommet of polystyrene and which is adapted as hereinafter described to electrically insulate the anode container from the cathode container of the cell.

As shown in Figure 1, the container 11 will hold the cell components and constituents as, for example, a thin disc or pellet of amalgamated zinc 14. Next, an absorbent pellet 17 containing the electrolyte potassium hydroxide is provided. A barrier layer 18 is placed adjacent said pellet 17, and a depolarizer of mercuric oxide 20 is placed next thereto. These are all placed within the confines of the grommet 13 as by being inserted within annular ring or wall 19 thereof. The relationship of the parts prior to crimping container 12 is shown in Figure 2. After crimping, the construction is shown as in Figures 3 and 4.

The cathode container 12 is constructed such that it forms an extruded cupola-like portion 30 dependent from the main portion 31 of the container 12. Extruded portion 30 has a bottom wall 32 of a diameter less than that of main portion 31 and is integrally joined to a bottom flange 33 thereof by an annular side wall 34 to give a male connecting protuberance thereby. Further, a side annular wall 35 extends up from flange 33 in a plane substantially parallel to that of wall 34. Wall 35 ends in a lip 37, the diameter of which is greater than the diameter of bottom wall 32. The entire construction has a step-like cup appearance.

Anode container 11 comprises a container having an annular disc 40 defining an inside wall 41 extending up therefrom and integrally joined thereto. An outside wall 42 having an extent greater than that of 41 is integrally connected to wall 41 by a collar 43 and extends downwardly below disc 40 to end in a horizontal flange 44 extending at a right angle therefrom. As shown in Figure 3, the diameter of disc 40, as taken at the top of collar 43, is such that it will tightly accept the adjacent protuberance 45 of the cathode container of a similarly constructed adjacent cell to be snap-fitted together.

As stated, an electrical insulator 13 comprising a grommet of plastic or other such suitable material, is placed between the anode and cathode containers. This grommet comprises two vertically extending concentric plastic rings 50 and 51 interconnected by a horizontal wall 52. Ring 50 is the inner ring and is much shorter than outer ring 51. As seen in Figure 2, ring 51 abuts the inside wall 42 of container 11, passing beneath flange 44 thereof and alongside the inside of flange 33 and wall 35 of container 12. Container 12 is then spun so that ring 51 forms an integrally joined section 60 and 61 with section 60 being angulated with respect to section 61 and being compressed against the outside surface of wall 42 by means of the crimp 62 formed in wall 35 of container 12. There is thus formed an inclined portion 63, crimped portion 62 and an angulated portion 65, all integrally joined and having a configuration such that in conjunction with wall 42 of container 11 there is formed a tight seal for the entire cell 10.

Cells 70, 71, 72, such as shown in Figure 5, are thus by means of this novel construction adapted to have the cathode containers thereof snugly fit into the anode container of an adjacent cell so that there need be no other means of connection. Thus, the necessity for soldering or welding the individual containers is completely eliminated while a tight positive electrical connection between the cells is assured. In addition, as seen in Figure 5, a cardboard sleeve 80 having a flange 81 is placed about the cells in a manner such that the flange 81 will be adapted to retain any determined number of cells therewithin in accordance with the stated electrical requirements. The container is adapted to have printed thereon necessary directions and indicia, such as voltage ratings. Thus, a high voltage battery may be constructed having any desired rating by simply snap-fitting the individual cell units and placing them within its cardboard sleeve.

While the present invention describes a novel multi-unit battery assembly construction by snap-fit interlocking of individual cell units, it is not intended that the invention be limited to the embodiment thereof, but rather to be given its proper scope and intent as shown by the following claims.

What is claimed is:

1. A battery comprising a plurality of individual cell units, each unit including a pair of top and bottom individual outer metal containers, one of said containers having anode materials placed therein, the other having cathode materials placed therein, and an electrical insulator placed between cooperating marginal regions of said containers and constituting therewith a sealed enclosure for the unit, said containers acting as anode and cathode terminals respectively of each unit, said container-terminals being constructed in a manner such that said bottom container has a portion integrally extruded thereof and said top container has a recess integrally formed therein, the diameter of said extruded portion and said recess being such that said extruded portion can be tightly press fitted within said recess portion, to be firmly held therein, said terminals thus making metal to metal contact so as to make a good electrical connection and to provide a mechanically stable pile between adjacent units of said battery so as to obviate the need for any additional stacking means.

2. A battery comprising a plurality of individual cell units, each unit including a pair of top and bottom individual outer metal containers, one of said containers having anode materials placed therein, the other container having cathode materials placed therein, and electrical insulation means compressed between cooperating marginal regions of said containers thereby sealing the unit, said containers acting as the anode and cathode terminals respectively for each unit, said container terminals being constructed in a manner such that one of said terminals has a portion integrally extruded therefrom and the other of said terminals has a recess integrally formed therein, said extruded portion having a dimension as compared to said recess that the extruded portion may be press fitted within the confines of said recess to be tightly held therein, said terminals thereby making a metal to metal gripping contact therebetween so as to form a stable mechanical pile between a plurality of adjacent cell units, the necessity for extra auxiliary stacking means to form such a pile being thus obviated.

3. A battery comprising a plurality of individual cell units, each unit including a pair of top and bottom individual outer metal containers, one of said containers having anode materials placed therein, the other container having cathode materials placed therein, and an electrical insulator and sealing member confined between cooperating marginal regions of said containers, said containers acting as the terminals of each cell, said outer container having an integrally extruded portion outwardly formed therein and said top container having a recessed portion integrally formed therein, the diameter of said recessed portion being such in conjunction with the resiliency of its metal to accept said extruded portion in a tight press fitting manner within its confines to hold the same tightly therewithin in a metal to metal contacting grip, said grip making for a mechanically stable pile between adjacent units of said battery obviating the need for extra stacking means.

4. In a battery containing a plurality of cell units, each unit comprising a pair of outer metal containers, one container having anode materials therein, said other container having cathode materials therein, and elastic electrical insulating material compressed between cooperating marginal regions of said containers to seal the unit, said containers acting as the positive and negative terminals respectively for each unit, one terminal having an integrally formed extrusion and the other terminal having a recess integrally formed therein, the area of the recess of said latter terminal being just sufficient to tightly accept the extrusion of said first terminal to grip the same in a press fitted manner to form a tight mechanical and stable coupling of metal to metal therebetween, said coupling obviating the need for any further connecting means.

5. An electrical current producing cell comprising a pair of metal containers respectively enclosing the positive and negative electrode materials and constituting the corresponding terminals of the cell, and an elastic insulating member compressed between cooperating marginal regions of said containers to seal the cell, one of said terminal-containers having a portion integrally extruded thereof and the other of said terminal-containers having a recess integrally formed therein, said extruded portion and said recess being of complementary shapes and of such dimensions that in assembling a battery stack from a plurality of the cells the extruded terminal portion of each cell can be tightly press-fitted within the terminal recess of an adjacent cell to be firmly held therein, said terminals thus making metal to metal contact and reliable series electrical connection between the cells to provide a mechanically stable stack without requiring any additional stacking means.

References Cited in the file of this patent

UNITED STATES PATENTS

| | | |
|---|---|---|
| 2,116,091 | Williams | May 3, 1938 |
| 2,536,698 | Ruben | Jan. 2, 1951 |
| 2,591,355 | Heraud | Apr. 1, 1952 |
| 2,666,800 | Hoynes | Jan. 19, 1954 |
| 2,672,498 | Temple | Mar. 16, 1954 |

FOREIGN PATENTS

| | | |
|---|---|---|
| 269,977 | Great Britain | Apr. 27, 1927 |
| 494,929 | Germany | Mar. 31, 1930 |